3,258,483
PROCESS FOR MAKING LOWER ALIPHATIC
ANHYDRIDES
Louis Alheritiere, Paul Biarnais, and Gilbert Sitaud, all of Melle, Deux-Sevres, France, assignors to Les Usines de Melle (Societe Anonyme), Deux-Sevres, France, a corporation of France
Filed Dec. 13, 1960, Ser. No. 75,530
Claims priority, application France, Dec. 15, 1959, 813,121
7 Claims. (Cl. 260—546)

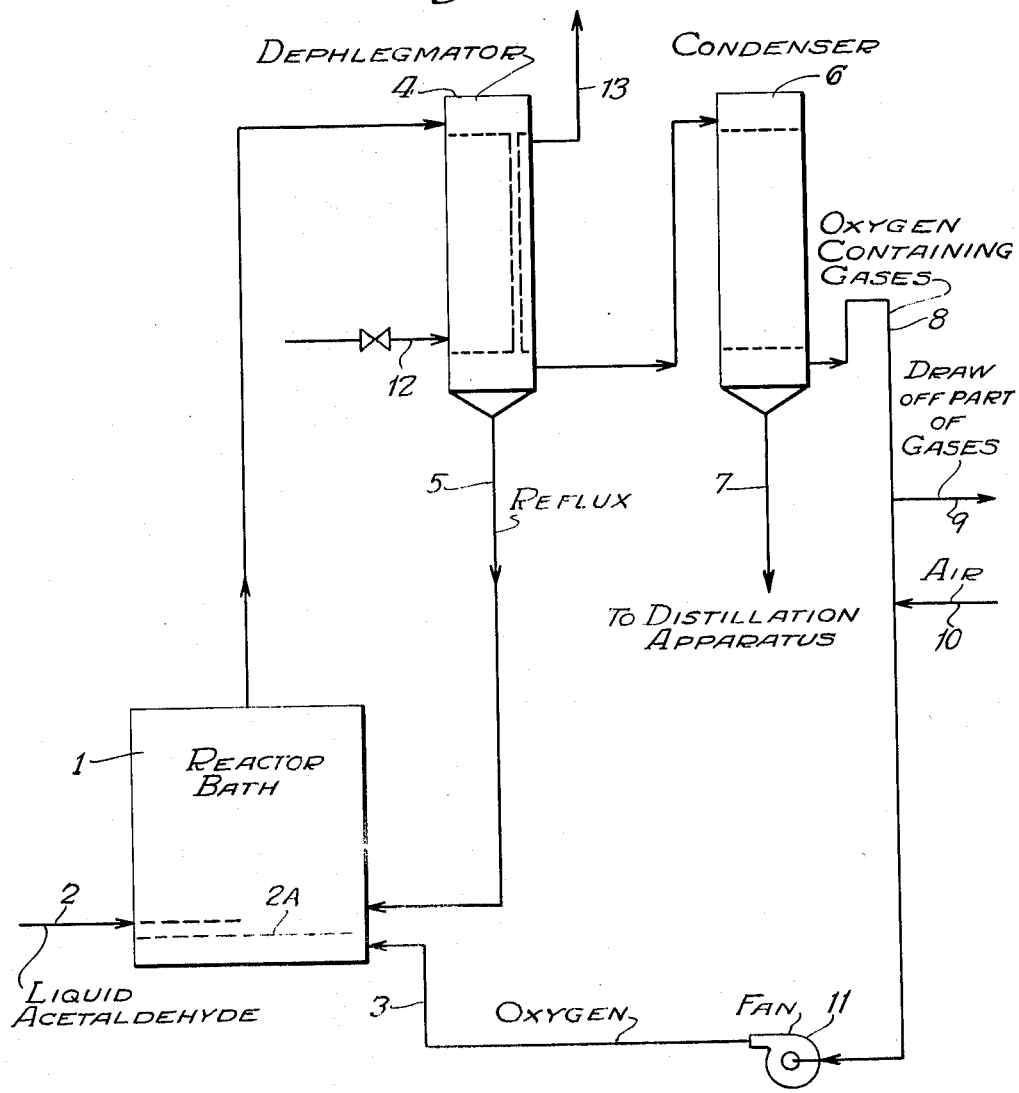

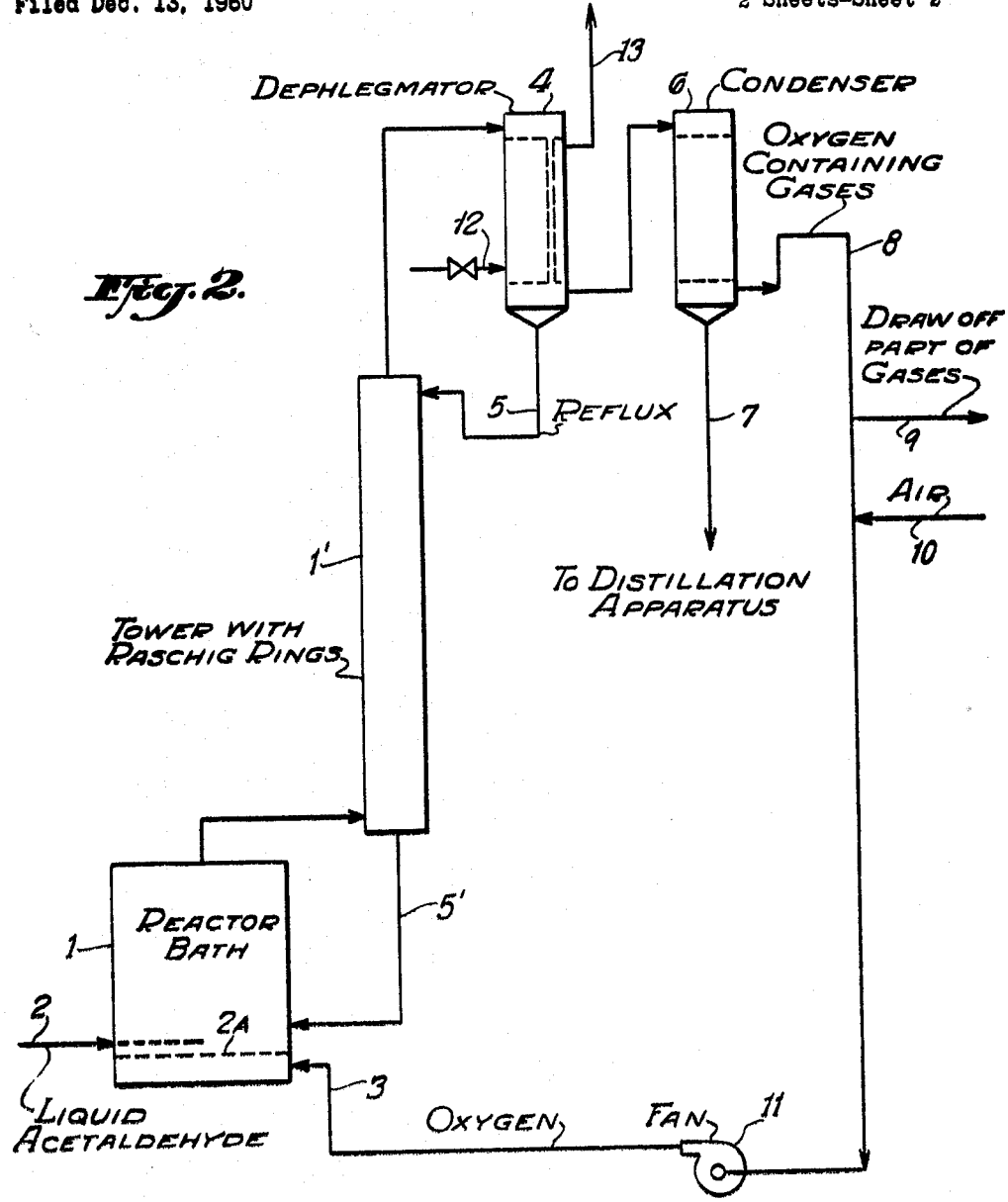

This invention relates to a process for making lower aliphatic anhydrides and acids by oxidation of the corresponding aldehyde.

It is known that acetic acid and anhydride can be produced continuously by feeding a liquid oxidation bath, containing a suitable oxidation catalyst, with acetaldehyde and an oxygen-containing gas and containing as intimately as possible the gaseous phase with the liquid phase.

Conventional oxidation catalysts for such known operations are metallic salts, more particularly copper or cobalt acetates or mixtures thereof; other metallic salts may be employed, such as silver, nickel, manganese, vanadium, mercury, tin or uranium acetates, nitrates or chlorides.

The aldehyde oxidation reaction is strongly exothermic and renders it necessary to cool by suitable means the bath, the temperature of which should be kept within given limits, namely between 30° and 70° C. for acetaldehyde (and below 105° C. for higher $C_3$–$C_4$ aldehydes such as butyraldehyde).

The known reaction bath may be constituted in part by a solvent such as ethyl acetate or ethyl phthalate, but it may also be constituted essentially by one or more products of the oxidation reaction itself, more particularly a mixture of acetic acid and anhydride.

For carrying out this latter form of operation, there is introduced into and through the bath an amount of oxygen-containing gas that is high enough to carry off as vapors the reaction products, acetic acid, acetic anhydride and water. The entrained vapors are condensed in a heat-exchanger and the residual oxygen-containing gas is recycled to the oxidation bath after a fraction of said gas has been discarded and replaced by fresh gas bringing the oxygen required by the reaction. The fresh oxygen-containing gas may be air or pure oxygen or generally a gas mixture containing oxygen.

Owing to the relative vapor pressures of the aforesaid three reaction products, water, acetic anhydride and acetic acid, the higher being that of water and the lower, that of acetic anhydride, the bath automatically comes to an equilibrium composition in which the acetic anhydride proportion is higher than the acetic acid proportion, and the water proportion is very low, namely not over 2–3%.

The larger the volume of oxygen-containing gas fed to the bath, the higher the anhydride proportion and the lower the water proportion in the bath. Under such conditions it is possible to obtain a very high yield of acetic anhydride, by conversion of acetaldehyde with such gas.

Thus, if the acetic anhydride proportion in the bath exceeds 85% by weight, the conversion of acetaldehyde to acetic anhydride may be as high as 75% or even higher.

However, beyond a certain amount of gas introduced into the bath per unit of time, the amount of vapors leaving the bath, which depends upon the composition and temperature of the bath and upon the volume of gas fed thereto, would exceed the amount of reaction products within the same time, and consequently the volume of the reaction bath would decrease.

In view of the fact that a reaction bath that has a very high content of acetic anhydride favors production of a high proportion of acetic anhydride with respect to acetic acid, which generally is a purpose aimed at, it has been proposed to maintain constant the volume of the bath by returning to said bath pure acetic anhydride separated from the condensate of the vapors, said separation being effected by suitable conventional means while avoiding reaction of anhydride with water.

It was thus possible actually to obtain an acetic anhydride yield of 75–80%, the acetic acid produced corresponding only to 20–25% of the acetaldehyde oxidized, but for obtaining this result it was necessary, in conventional practice, to carry off from the bath and to separate from the condensed vapors amounts of acetic anhydride and acid which were far above (approximately twice) the amount of those products actually produced, thus resulting in a noticeable excess heat expense, the separation being carried out by distillation.

This invention is based upon the discovery that it is possible to obtain as advantageous results, from the anhydride-produced to acid-produced ratio standpoint, if compensation for the loss of products of the bath due to the strong gaseous feed is provided, not by returning to the bath pure anhydride as in conventional processes, but by condensing the required fraction of the vapors evolved by the reaction bath and entrained by the residual gases, and without separating its components refluxing to the bath the whole of the condensate so produced.

The principal object of the invention is to provide a simple efficient process of the kind described in which the size of the apparatus units for carrying out the process as well as the consumption of heat may be considerably reduced.

In carrying out the process and aldehyde containing 2 to 4 carbon atoms along with oxygen is passed into a bath containing the corresponding acid and at least 80–85% of the corresponding anhydride in the presence of an aldehyde oxidation catalyst. Where the aldehyde is acetaldehyde, which contains 2 carbon atoms, acetic anhydride and acetic acid are produced, and the bath will contain acetic anhydride in the proportion mentioned. The oxygen is preferably that contained in the air. The oxidation catalyst may be copper or cobalt acetate, or mixtures thereof. Other metallic salts may be employed, such as the nitrates, acetates or chlorides of silver, nickel, manganese, vanadium, mercury, tin or uranium. The reaction of the aldehyde with oxygen is an exothermic reaction. A gas-vapor mixture is produced containing said anhydride and acid, and is removed from the bath. This gas-vapor mixture is partially condensed and the condensate is refluxed to the bath. The amount of refluxed condensate is such as to maintain the volume of the bath substantially constant. The condensation mentioned only partially condenses the gas-vapor mixture, and the remainder of the vapors in this mixture is substantially wholly condensed and the second condensate is passed to a distillation apparatus where it is distilled to recover anhydride and acid therefrom. Part of the residual gases are liberated and the remainder is recycled with fresh oxygen to said bath.

For carrying the process of this invention into effect, one inserts in the line for gaseous fluids leaving the oxidation vessel a condenser in which the throughput of cooling fluid (preferably cooling water, but without limitation) is so controlled that the volume of reaction bath under reflux of the condensate remains substantially constant. For the sake of clarity this condenser which liquefies the desired portion of the evolved vapors will be termed hereinafter "dephlegmator."

Such a device permits considerable reduction of volume of the distillation apparatus required to subsequently separate the reaction products from one another and consequent reduction of heat expense.

The liquid so refluxed to the reaction bath is very rich in anhydride, though not being pure anhydride. The anhydride content is at least approximately 75%.

Thus a saving of approximately 40–50% of the heat required in the old process is effected. Similarly the size of the distilling columns for obtaining substantially pure anhydride and acid from the second condensate (usually three columns are required for such operation) is reduced to diameters of approximately 65–75% of those of the distilling columns required in the old process. A corresponding reduction in cost, both for apparatus and heat, is thereby made.

It is possible, without additional costs, to make still richer in anhydride the condensate refluxed to the bath, by feeding the gaseous fluids leaving the bath to the lower part of a distilling column to the head of which is refluxed the liquid condensed in the dephlegmator. This distilling column may be a conventional column fitted with bubble trays or bubble caps; or else it may be a contact tower charged with packing bodies such as Raschig rings or the like. The column or tower may be disposed separately from the reaction vessel or directly surmounting same.

It is important, however, to employ as a distilling column or tower an apparatus which will avoid as much as possible long contact of the anhydride, such as acetic anhydride, with water, thereby to limit hydrolysis of the anhydride.

It should be emphasized that the distillation of the condensed liquid in the presence of gaseous effluent, in the aforementioned distilling column or tower, is effected with mere use of the reaction heat, without external heat supply.

In either operating mode, the composition of the bath comes to an equilibrium state determined by the working conditions, viz., aldehyde (such as acetaldehyde) and fresh oxygen-containing gas feed rates, gas recycle, and temperatures. These operating factors are controlled so as to provide a reaction bath containing at least 80–85% by weight anhydride, the remainder being substantially the corresponding acid.

The gas and vapors leaving the dephlegmator are subjected, as in conventional processes, to suitable cooling in a final condensing device in which the anhydride, acid and water produced by the reaction are liquefied and separated in liquid state from the residual gases.

For carrying the process of this invention into effect using acetaldehyde as an example, the following conditions are preferably adopted:

Temperature of the oxidation bath: 40–70° C., more advantageously 50–60° C.
Temperature in the final condensing device: Below 20° C., more advantageously below 12° C.
Rate of introduction of gas into the oxidation bath: 2–6 cubic meters per hour per liter of bath, more advantageously 3–4.5 cubic meters per hour per liter of bath.

Ratio, $\frac{anhydride}{anhydride + acid}$ in the bath at the equilibrium: 85–95%.

In the accompanying drawings forming part of this application:

FIG. 1 is a flow sheet showing the steps of the process, and

FIG. 2 is a similar flow sheet showing a modification of the process of FIG. 1.

The following are examples of the process as we now prefer to practice it. It is to be understood that the examples are illustrative, and that the process is not to be considered as restricted thereto except as indicated in the appended claims:

*Example 1*

The reaction bath, initially consisting of a mixture of 65% acetic anhydride, 30% acetic acid and 5% acetaldehyde, to which there was added, as a catalyst, 0.3% copper acetate and 0.1% cobalt acetate, is contained in a vessel 1 (FIG. 1) fitted at its lower part with a device for injecting and dispersing air into and through the liquid bath. Under the working conditions given below the bath comes to an equilibrium, and into this bath the acetaldehyde and an oxygen-containing gas, namely air, is introduced. At such equilibrium the bath contains the following ingredients in the proportions mentioned:

|  | Percent |
|---|---|
| Acetic anhydride | 84 |
| Acetic acid | 10.3 |
| Water | 0.7 |
| Acetaldehyde | 4.6 |
| Copper acetate | 0.3 |
| Cobalt acetate | 0.1 |

Air is fed into the liquid bath through a device which is for example a perforated or a porous plate. Liquid acetaldehyde is continuously fed to the bath by pipe 2, and air is fed into the bath through the porous plate 2a through pipe 3. The gas-vapor mixture leaving the top of the reaction vessel 1 is constituted approximately as follows:

| Gas mixture (by volume): | |
|---|---|
| Oxygen, percent | 8.1 |
| Carbon dioxide, percent | 0.6 |
| Nitrogen, percent | 91.3 |
| Vapors carried by each cubic meter of gas-vapor mixture: | |
| Acetic anhydride, grams | 144 |
| Acetic acid, grams | 39 |
| Water, grams | 23 |
| Acetaldehyde, grams | 536 |

The gas-vapor mixture passes through dephlegmator 4, in which the rate of cooling water is so controlled that the condensed products, which are refluxed to the reaction bath by pipe 5, represent the volume required to maintain constant the volume of the reaction bath.

The mixture of residual gases and vapors leaving the dephlegmator passes through condenser or condensers 6 in which are liquefied the remaining reaction products which are sent by pipe 7 to a distilling apparatus (not shown) for separating them from one another. Residual oxygen-containing gases leave condensing device 6 by pipe 8. A portion of these residual gases is drawn off by pipe 9 (the remainder being recycled by pipe 3), and residual acetaldehyde is recovered therefrom by washing them and distilling the acetaldehyde solution so obtained, in accordance with conventional techniques, before discarding these residual gases. Fresh oxygen-containing gas (e.g. air) is fed to the system by pipe 10, and the mixture of recycled residual gases and fresh oxygen-containing gas is sent to reaction vessel 1 by fan 11 and pipe 3.

The operating conditions were as follows:

| | |
|---|---|
| Volume of the reaction bath, liters | 2000 |
| Acetaldehyde feed, kg./hr. | 1180 |
| Total gas throughput in fan 11, m.³/hr. | 8500 |
| Fresh air feed, m.³/hr. | 1000 |
| Temperature of the reaction bath, ° C. | 55 |
| Temperature of the fluids at the outlet of the dephlegmator, ° C. | 39 |
| Temperature of the fluids at the outlet of the condensing device, ° C. | 10 |
| Amount of liquid refluxed to the bath by pipe 5, kg./hr. | 620 |

Reaction products collected by pipe 7:
- Acetic anhydride, kg./hr. _____ 445
- Acetic acid, kg./hr. _____ 149
- Water, kg./hr. _____ 81.5
- Acetaldehyde, kg./hr. _____ 200

Acetic anhydride yield (i.e. acetaldehyde converted into anhydride with respect to the acetaldehyde converted into acid plus anhydride), percent ____ 77.9

The distillation apparatus (not shown) is fed by pipe 7 with a mixture of 594 kgs. per hour of acid plus anhydride. If a dephlegmator is not employed as in accordance with this invention, an additional amount of about 620 kgs. per hour of acetic anhydride is to be distilled in the distillation apparatus, to be fed back to the reaction bath for maintaining constant the volume thereof.

Accordingly the use of the dephlegmator in accordance with the invention permits reduction of the volume of the distillation apparatus and of the heat expense required for separation of the reaction products from one another.

*Example 2*

The same starting reaction bath as in Example 1, except that 0.5% copper acetate was used, is contained in a vessel 1 (FIG. 2) fitted at its lower part with a device for injecting and dispersing air into and through the liquid bath. Under the working conditions given below the bath comes to an equilibrium, and into this bath the acetaldehyde and an oxygen-containing gas, namely air, is introduced. At such equilibrium the bath contains the following ingredients in the proportions mentioned:

Percent
- Acetic anhydride _____ 89.7
- Acetic acid _____ 5.3
- Water _____ 0.4
- Acetaldehyde _____ 4
- Copper acetate _____ 0.5
- Cobalt acetate _____ 0.1

Air is fed into the liquid bath through a device which is for example a perforated or a porous plate. Liquid acetaldehyde is continuously fed to the bath by pipe 2 and air is fed into the bath through the porous plate 2a through pipe 3. The gas-vapor mixture leaving the top of the reaction vessel 1 is constituted approximately as follows:

Gas mixture (by volume):
- Oxygen, percent _____ 10.5
- Carbon dioxide, percent _____ 0.75
- Nitrogen, percent _____ 88.75

Vapors carried by each cubic meter of gas-vapor mixture:
- Acetic anhydride, grams _____ 284
- Acetic acid, grams _____ 40
- Water, grams _____ 24
- Acetaldehyde, grams _____ 850

The gas-vapor mixture passes through distilling tower 1' filled with Raschig rings and through dephlegmator 4, in which the rate of cooling water is so controlled that the condensed products which are refluxed from the base of tower 1' to the reaction bath by pipe 5' represent the volume required to maintain constant the volume of the reaction bath.

The operating conditions were as follows:
- Volume of the reaction bath, liters _____ 2000
- Acetaldehyde feed, kg./hr. _____ 1690
- Total gas throughput in fan 11, m.³/hr. _____ 9000
- Fresh air feed, m.³/hr. _____ 1225
- Reaction temperature, ° C. _____ 60
- Temperature of the fluids at the outlet of the dephlegmator, ° C. _____ 29
- Temperature of the fluids at the outlet of the condensing device, ° C. _____ 11
- Amount of liquid refluxed to the bath by pipe 5', kg./hr. _____ 1450

Reaction products collected by pipe 7:
- Acetic anhydride, kg./hr. _____ 484
- Acetic acid, kg./hr. _____ 106
- Water, kg./hr. _____ 90
- Acetaldehyde, kg./hr. _____ 317
- Anhydride yield, percent _____ 84.3

*Example 3*

This example is carried out in the apparatus of Example 1. The starting bath is a mixture of 70% butyric anhydride, 25% butyric acid and 5% butyraldehyde, to which there was added, as a catalyst, 0.4% copper acetate and 0.1% cobalt acetate. Air and n-butyraldehyde are introduced into the bath in the manner described. At the equilibrium the bath contains the following ingredients in the proportions mentioned:

Percent
- Butyric anhydride _____ 92
- Butyric acid _____ 4.5
- Water _____ 0.2
- Butyraldehyde _____ 2.8
- Copper acetate _____ 0.4
- Cobalt acetate _____ 0.1

The gas-vapor mixture leaving the top of reaction vessel 1 is constituted approximately as follows:

Gas mixture (by volume):
- Oxygen, percent _____ 6.8
- Carbon dioxide, percent _____ 1.5
- Nitrogen, percent _____ 91.7

Vapors carried by each cubic meter of gas-vapor mixture:
- Butyric anhydride, grams _____ 100
- Butyric acid, grams _____ 24
- Water, grams _____ 14
- Butyraldehyde, grams _____ 188

The operating conditions were as follows:
- Volume of the reaction bath, liters _____ 1650
- Butyraldehyde feed, kg./hr. _____ 1250
- Total gas throughput in fan 11, m.³/hr. _____ 9100
- Fresh air feed, m.³/hr. _____ 850
- Reaction temperature, ° C. _____ 83–85
- Temperature of the fluids at the outlet of the dephlegmator, ° C. _____ 72–74
- Temperature of the fluids at the outlet of the condensing device, ° C. _____ 12
- Amount of liquid refluxed to the bath by pipe 5, kg./hr. _____ 235

Reaction products collected by pipe 7:
- Butyric anhydride, kg./hr. _____ 625
- Butyric acid, kg./hr. _____ 183
- Water, kg./hr. _____ 90
- Butyraldehyde, kg./hr. _____ 356
- Anhydride yield, percent _____ 79.2

The condensate is heterogeneous and separates into two layers. Approximately 60% of the water therein can be separated by decanting the condensate, water constituting the lower layer in the decanted liquid.

The present invention may be applied to the manufacture not only of acetic anhydride or butyric anhydride as hereinabove described and illustrated, but generally of aliphatic anhydrides having 4 to 8 carbon atoms in the molecule, produced from aldehydes of 2 to 4 carbon atoms.

We claim:

1. In the process of producing the corresponding anhydride by the catalytic oxidation of an aldehyde containing from two to four carbon atoms by molecular oxygen in a liquid reaction medium, the improvement which comprises partially condensing the gas-vapor mixture issuing from said reaction medium and refluxing the partial condensate still containing substantial amounts of water to densate still containing substantial amounts of water to sai said reaction medium in sufficient quantities to maintain the volume of the reaction medium substantially constant and the concentration of said anhydride therein at least 80–85% by weight.

2. In the process of producing the corresponding anhydride by the catalytic oxidation of an aldehyde containing two to four carbon atoms by molecular oxygen in a liquid reaction medium, the improvement which comprises partially condensing the gas-vapor mixture issuing from said reaction medium by passing the same through a distilling tower and dephlegmator and refluxing the partial condensate still containing substantial amounts of water to said reaction medium in sufficient quantities to maintain the volume of the reaction medium substantially constant and the concentration of said anhydride therein at least 80–85% by weight.

3. In the process of producing the corresponding anhydride by the catalytic oxidation of an aldehyde containing two to four carbon atoms by molecular oxygen in a liquid reaction medium, the improvement which comprises partially condensing the gas-vapor mixture issuing from said reaction medium and refluxing the partial condensate still containing substantial amounts of water to said reaction medium in sufficient quantities to maintain the volume of the reaction medium substantially constant and the concentration of said anhydride therein at least 80–85% by weight, further condensing the said mixture to produce a second condensate, and distilling the said second condensate to recover said anhydride therefrom and recycling at least part of the residual gas with fresh oxygen to said reaction medium.

4. In the process of producing the corresponding anhydride by the catalytic oxidation of an aldehyde containing two to four carbon atoms by air in a liquid reaction medium, the improvement which comprises partially condensing the gas-vapor mixture issuing from said reaction medium and refluxing the partial condensate still containing substantial amounts of water to said reaction medium in sufficient quantities to maintain the volume of the reaction mixture substantially constant and the concentration of said anhydride therein at least 80–85% by weight.

5. In the process of producing the corresponding anhydride by the catalytic oxidation of an aldehyde containing two to four carbon atoms by air in a liquid reaction medium, the improvement which comprises partially condensing the gas-vapor mixture issuing from said reaction medium and refluxing the partial condensate still containing substantial amounts of water to said reaction medium in sufficient quantities to maintain the volume of the reaction mixture substantially constant and the concentration of said anhydride therein at least 80–85% by weight and recovering anhydride from the remainder of said gas-vapor mixture.

6. In the process of producing acetic anhydride by catalytic oxidation of acetaldehyde by molecular oxygen in a liquid reaction medium, the improvement which comprises partially condensing the gas-vapor mixture issuing from said reaction medium and refluxing the partial condensate still containing substantial amounts of water to said reaction medium in sufficient quantities to maintain the volume of the reaction medium substantially constant and the concentration of said anhydride therein at least 80–85% by weight.

7. In the process of producing acetic anhydride by catalytic oxidation of acetaldehyde by molecular oxygen in a liquid reaction medium, the improvement which comprises partially condensing the gas-vapor mixture issuing from said reaction medium and refluxing the partial condensate still containing substantial amounts of water to said reaction medium in sufficient quantities to maintain the volume of the reaction medium substantially constant and the concentration of said anhydride therein at least 80–85% by weight, further condensing said mixture to produce a second condensate, distilling said second condensate to recover said acetic anhydride therefrom and recycling at least part of the residual gas with fresh oxygen to said reaction medium.

References Cited by the Examiner
UNITED STATES PATENTS

| | | | |
|---|---|---|---|
| 2,575,159 | 11/1951 | Chassaing et al. | 260—546 |
| 2,658,914 | 6/1953 | Rigon | 260—546 |
| 2,872,481 | 2/1959 | Vogt | 260—546 |

LORRAINE A. WEINBERGER, *Primary Examiner.*

LEON ZITVER, *Examiner.*

F. D. HIGEL, R. K. JACKSON, *Assistant Examiners.*